(12) United States Patent
Kim et al.

(10) Patent No.: US 8,916,650 B2
(45) Date of Patent: Dec. 23, 2014

(54) VINYL CHLORIDE-BASED COPOLYMER RESIN AND A METHOD OF PREPARING THE SAME

(71) Applicant: Hanwha Chemical Corporation, Seoul (KR)

(72) Inventors: Ji-Woo Kim, Daejeon (KR); Jee-Hyong Lee, Daejeon (KR); Jung-Ho Kong, Daejeon (KR); Yong-Kook Jung, Daejeon (KR); Sang-Hyun Cho, Daejeon (KR)

(73) Assignee: Hanwha Chemical Corporation, Seoul (KR)

( * ) Notice: Subject to any disclaimer, the term of this patent is extended or adjusted under 35 U.S.C. 154(b) by 0 days.

(21) Appl. No.: 13/980,186

(22) PCT Filed: Jul. 16, 2013

(86) PCT No.: PCT/KR2013/006360
§ 371 (c)(1),
(2), (4) Date: Jul. 17, 2013

(87) PCT Pub. No.: WO2014/046377
PCT Pub. Date: Mar. 27, 2014

(65) Prior Publication Data
US 2014/0275425 A1    Sep. 18, 2014

(30) Foreign Application Priority Data

Sep. 21, 2012 (KR) .................. 10-2012-0105289

(51) Int. Cl.
| | | |
|---|---|---|
| *C08F 259/04* | (2006.01) | |
| *C08F 2/20* | (2006.01) | |
| *C08L 27/06* | (2006.01) | |
| *B32B 5/22* | (2006.01) | |
| *C08F 4/34* | (2006.01) | |

(52) U.S. Cl.
CPC .............. *C08L 27/06* (2013.01); *Y10S 525/902* (2013.01); *Y10S 526/909* (2013.01)
USPC ........... 525/308; 525/267; 525/273; 525/902; 526/87; 526/200; 526/202; 526/329.4; 526/909; 428/407

(58) Field of Classification Search
CPC .......... B32B 5/30; B32B 27/304; C08F 2/20; C08F 220/12; C08F 259/04; C08L 27/06
USPC ......... 428/407; 526/87, 200, 202, 329.4, 909; 525/308, 902, 267, 273
See application file for complete search history.

(56) References Cited

U.S. PATENT DOCUMENTS

| 5,194,498 | A * | 3/1993 | Stevenson et al. ............... 525/81 |
| 6,479,147 | B2 * | 11/2002 | Lubnin et al. .................. 428/407 |
| 2010/0331491 | A1 * | 12/2010 | Kitayama et al. ............. 525/222 |

FOREIGN PATENT DOCUMENTS

| JP | 11-080282 | 3/1999 |
| KR | 10-0160332 | 8/1998 |
| KR | 10-0259206 | 6/2000 |
| KR | 10-2004-0045778 | 6/2004 |
| KR | 10-2012-0054162 | 5/2012 |

OTHER PUBLICATIONS

International Search Report and Written Opinion for International Application No. PCT/KR2013/006360 dated Oct. 8, 2013 (44 pages).

* cited by examiner

*Primary Examiner* — Fred M Teskin
(74) *Attorney, Agent, or Firm* — Michael Best & Friedrich LLP

(57) ABSTRACT

The present invention relates to an inner-plasticized vinyl chloride-based copolymer resin not requiring plasticizers and a preparation method thereof. Specifically, the vinyl chloride-based copolymer resin is prepared by a suspension polymerization method of initiating the polymerization of vinyl chloride monomer, feeding a certain amount of butyl acrylate continuously or discontinuously thereinto and carrying out the additional polymerization at the temperature higher than the polymerization initiation temperature so as to prepare a core-shell type vinyl chloride-based random copolymer resin. The vinyl chloride-based copolymer resin of core-shell structure prepared by the present invention includes vinyl chloride-butyl acrylate copolymer, and it can provide a vinyl chloride-butyl acrylate copolymer product which can be processed without plasticizers positively necessary to produce a soft product.

12 Claims, 1 Drawing Sheet

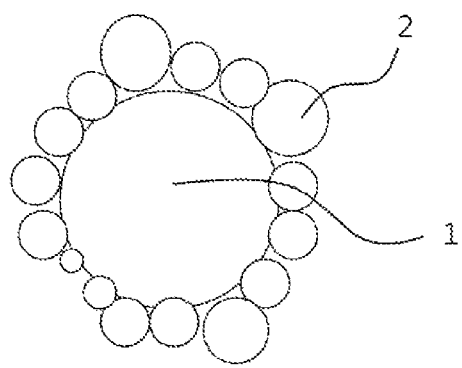

VINYL CHLORIDE-BASED COPOLYMER RESIN AND A METHOD OF PREPARING THE SAME

CROSS-REFERENCE TO RELATED APPLICATIONS

This is a U.S. national stage entry of International Patent Application No. PCT/KR2013/006360, filed Jul. 16, 2013, which claims priority to Korean Patent Application No. 10-2012-0105289, filed on Sep. 21, 2012.

TECHNICAL FIELD

The present invention relates to an inner-plasticized vinyl chloride-based copolymer resin having core-shell structure and a method of preparing the same.

BACKGROUND

Vinyl chloride-based resin is a general-purpose resin being used most extensively as living or industrial materials with olefin resins. Most of such vinyl chloride-based resins have been prepared by homopolymerization of vinyl chloride monomer. And it is being tried to develop and commercialize vinyl chloride-based copolymer resin having physical properties that could not be obtained from the vinyl chloride alone, by copolymerizing the same with various other monomers.

Polyvinyl chloride and vinyl chloride-based copolymers are being used for various purposes such as a floor material, an outdoor advertising sheet, a wall paper, or a mat. Recently, the applications to baby toys and medical purpose requiring eco-friendly property and nontoxicity to human body are increasing.

In addition, vinyl chloride grafting copolymers such as a graft copolymer of vinyl acetate and butyl acrylate are being developed for improving the productivity, and now they are being produced and on sale.

However, since polyvinyl chloride and the vinyl chloride-based copolymer resins cannot have or are lacking in softness autonomously, plasticizers such as phthalic acid esters, adipic acid esters, or phosphoric acid esters are added thereto for giving them softness. But, the vinyl chloride-based resins outer-plasticized by the addition of plasticizer show hardening property caused by migration, or extraction property by a solvent, and the range of their use is being narrowed in concert with recent environmental problems.

Furthermore, most of the vinyl chloride-based copolymers were developed for improving the thermal plasticity, flexibility, or solubility of the polymer, and most of the products developed hitherto has been used as the means for giving easy processability.

Among the vinyl chloride-based copolymers, the vinyl chloride-vinyl acetate copolymer is most widely known, and commercialized and used. The vinyl chloride-vinyl acetate copolymer has similar use to existing polyvinyl chloride resins but the cost of vinyl acetate is expensive and the content of vinyl acetate in the copolymer is insufficient to improving the processability of the final product with exclusive usage of the same.

However, there is a growing trend in the development and use of the vinyl chloride-based copolymers for the purpose of replacing the use of plasticizers which are relatively expensive and have the environmental problems disclosed above.

But, the inner-plasticized vinyl chloride-based copolymer resins having eco-friendly and excellent properties have not been developed yet.

SUMMARY

To resolve the problems above, it is an aspect of the present invention to provide a core-shell type inner-plasticized vinyl chloride-based copolymer resin having a soft characteristic without a plasticizer which is obtained by optimizing the feeding method and time of butyl acrylate monomer, and the method of preparing the same which can control the content of butyl acrylate in the copolymer easily.

It is another aspect of the present invention to provide a resin product having a core-shell type particle form for improving convenience in use of the resin.

The present invention provides a vinyl chloride-based copolymer resin of core-shell structure, characterized in that the core includes a vinyl chloride-butyl acrylate polymer, the shell includes a polyvinyl chloride, and the content of butyl acrylate in the copolymer is 10 to 50 wt % per the weight of the whole copolymer resin.

The vinyl chloride-based copolymer resin of core-shell structure may include 85 to 95 wt % of vinyl chloride-butyl acrylate polymer which is the core, and 5 to 15 wt % of polyvinyl chloride which is the shell.

And, the vinyl chloride-based copolymer resin may be a spherical particle having the average diameter of 50 to 250 μm and may have the volumetric specific gravity of 0.3 to 0.7 g/cc and the shore hardness of 80 to 100.

Furthermore, the present invention provides a method of preparing the vinyl chloride-based copolymer resin of core-shell structure of claim 1, including the steps of:

(a) mixing 0.09 to 0.6 parts by weight of a suspending agent and 0.05 to 0.15 parts by weight of an initiator with 100 parts by weight of the total sum of vinyl chloride monomer and butyl acrylate monomer, and initiating a reaction at the polymerization temperature of 40 to 60° C.; and (b) partitively feeding 5 to 43 parts by weight of butyl acrylate monomer per 100 parts by weight of the total sum of vinyl chloride monomer and butyl acrylate monomer into the reaction product of step (a) continuously or discontinuously for 3 to 7 hrs and carrying out a suspension polymerization at the polymerization temperature of 45 to 70° C.

In the present invention, the suspending agent may include a first suspending agent selected from a polyvinyl alcohol-based (hereinafter, PVA-based) compound having the degree of saponification of 60 to 80%, a cellulose-based compound, and a mixture thereof; a second suspending agent selected from a PVA-based compound having the degree of saponification of 30 to 50%, a 20 to 40% hydroxylated cellulose-based compound, and a mixture thereof; or a mixture of the first suspending agent and the second suspending agent.

The present invention also provides a resin product of particle form, including 100 wt % of the vinyl chloride-based copolymer resin of core-shell structure disclosed above.

The present invention also provides a resin product, using the vinyl chloride-based copolymer resin of core-shell structure as a processing material or an impact modifier.

As disclosed above, according to the present invention, the content of butyl acrylate in the vinyl chloride-butyl acrylate copolymer can be easily controlled by controlling the input of butyl acrylate monomer in the reaction. Therefore, the vinyl acrylate-based copolymer resins prepared by such method have a core-shell structure including the vinyl chloride-butyl acrylate copolymer as the core and polyvinyl chloride as the shell, and they can be used for providing resin products superior in processability and eco-friendly property due to the inner-plasticization not requiring a plasticizer when they are applied to soft products.

BRIEF DESCRIPTION OF THE DRAWINGS

The FIGURE is a schematic drawing illustrating the cross-section of the core-shell structure of the vinyl chloride-based copolymer resin including the vinyl chloride-butyl acrylate copolymer according to one embodiment of the present invention.

DETAILED DESCRIPTION

Hereinafter, the present invention is explained in more detail.

The present invention relates to a method of preparing a vinyl chloride-butyl acrylate copolymer having an inner-plasticized characteristic. More specifically, the present invention provides a method of preparing a vinyl chloride-butyl acrylate-based copolymer including the steps of feeding butyl acrylate monomer continuously or discontinuously into vinyl chloride monomer and polymerizing a random copolymer by a suspension polymerization so as to form a core-shell structure. The method of the present invention can control the content of butyl acrylate monomer with comparative ease during the preparation of copolymer, and can provide vinyl chloride-based copolymer resins having different volumetric specific gravity and softness depending on the content.

Furthermore, the present inventors intended to use the copolymer not only as the resin alone but also as an additive functioning as a processing material or an impact modifier, and particularly, intended to improve convenience in use of the resin by using the characteristic of the core-shell structure.

According to one embodiment of the present invention, a vinyl chloride-based copolymer resin of core-shell structure characterized in that the core includes a vinyl chloride-butyl acrylate polymer, the shell includes a polyvinyl chloride, and the content of butyl acrylate in the copolymer is 10 to 50 wt % per the weight of the whole copolymer resin is provided.

The present invention uses vinyl chloride monomer and butyl acrylate monomer, and the key point of the present invention is 'core-shell structure' including vinyl chloride and butyl acrylate.

Various types of vinyl chloride-butyl acrylate copolymers have been known but they have a problem of lower workability than other copolymers due to the sticky property of butyl acrylate.

On this account, the present invention intends to resolve the problem of existing vinyl chloride-butyl acrylate copolymer, and provides a polymerization process for preparing the vinyl chloride-butyl acrylate copolymer of 'core-shell structure' and a core-shell type copolymer prepared by such method. The copolymer obtained by the method of the present invention is not sticky and inner-plasticized copolymer, and thus it can provide a resin product without extra plasticizer. Furthermore, the copolymer of the present invention can be prepared into a particle form, and it can be used as the resin alone or as various additives.

The vinyl chloride-based copolymer resins of core-shell structure means the resin including the vinyl chloride-butyl acrylate copolymer, and specifically, the prepared particles include an inner core of vinyl chloride-butyl acrylate copolymer and an outer shell of polyvinyl chloride particles.

Such vinyl chloride-based copolymer resin of core-shell structure may include 85 to 95 wt % of vinyl chloride-butyl acrylate polymer which is the core, and 5 to 15 wt % of polyvinyl chloride which is the shell.

The vinyl chloride-based copolymer resin is a spherical particle of core-shell structure having the average diameter of 50 to 250 μm, the volumetric specific gravity of 0.3 to 0.7 g/cc, and the excellent shore hardness of about 80 to 100. Therefore, the resin can be used alone or as an additive when it is applied to a product.

Meanwhile, the present invention is characterized in that butyl acrylate monomer is continuously or discontinuously fed in order to prepare the vinyl chloride resin of core-shell structure, the polymerization temperature range is controlled within 40 to 70° C. in order to optimize the feeding time of monomer, and the polymerization is carried out through 2 steps by controlling the temperature range.

According to another embodiment of the present invention having such characteristics, a method of preparing the vinyl chloride-based copolymer resin of core-shell structure, including the steps of: (a) mixing 0.09 to 0.6 parts by weight of a suspending agent and 0.05 to 0.15 parts by weight of an initiator with 100 parts by weight of the total sum of vinyl chloride monomer and butyl acrylate monomer, and initiating a reaction at the polymerization temperature of 40 to 60° C.; and (b) partitively feeding 5 to 43 parts by weight of butyl acrylate monomer per 100 parts by weight of the total sum of vinyl chloride monomer and butyl acrylate monomer into the reaction product of step (a) continuously or discontinuously for 3 to 7 hrs and carrying out a suspension polymerization at the polymerization temperature of 45 to 70° C. is provided.

Namely, the method of the present invention includes the steps of feeding a certain amount of butyl acrylate monomer into vinyl chloride monomer, and carrying out a suspension polymerization within the polymerization temperature range of 40 to 70° C. In the present invention, the polymerization is basically carried out within the temperature range, and it is preferable for the stability of initial particle formation that the polymerization initiation temperature is slightly lower than the second polymerization temperature of step (b). Therefore, when the polymerization is carried out in the temperature range, it is most preferable in the present invention to carry out the polymerization through 2 steps of: initiating the polymerization by using vinyl chloride monomer, a suspending agent, and an initiator at the temperature of about 40 to 60° C.; and carrying out second step of polymerization by elevating the temperature to 45 to 70° C. after partitively feeding butyl acrylate monomer continuously or discontinuously thereinto.

Furthermore, the present invention can control the input of butyl acrylate-based monomer for the reaction by introducing butyl acrylate not in a lump but over 3 to 7 hrs, and the content of butyl acrylate in the final copolymer resin can be controlled according to this.

On the other hand, the step (a) is the step of initiating the reaction for providing the vinyl chloride-butyl acrylate copolymer, the core, and the initial reactant mixture for the copolymerization includes vinyl chloride monomer, a suspending agent, and an initiator. Preferably, the present invention can use 2 or more kinds of suspending agents and initiators. Furthermore, the present invention can use additives well known in the art additionally, and for example, an antifoaming agent, a buffer, a stabilizer, and the like may be used.

According to preferable one embodiment, the initial reactant mixture includes a first suspending agent, a second suspending agent, a lower temperature initiator, a higher temperature initiator, and so on, and may further include an antifoaming agent, a buffer, a stabilizer, and the like in addition to said constituents.

In the present invention, the suspending agent may include a mixture of a first suspending agent selected from a PVA-based compound having the degree of saponification of 60 to 80%, a cellulose-based compound, and a mixture thereof and a second suspending agent selected from a PVA-based compound having the degree of saponification of 30 to 50%, a 20 to 40% hydroxylated cellulose-based compound, and a mixture thereof. Furthermore, the suspending agent may include a first suspending agent selected from a PVA-based compound having the degree of saponification of 50 to 80%, a cellulose-based compound, and a mixture thereof.

Namely, it is possible to use the first suspending agent and the second suspending agent together or to use the first suspending agent alone for improving the suspension stability and the particle size control.

As disclosed above, the first suspending agent may be selected from the PVA-based suspending agent and the cellulose-based suspending agent, and the second suspending agent may be selected from the PVA-based suspending agent having the degree of saponification different to the first suspending agent and the hydroxylated cellulose.

The total amount of the suspending agent may be 0.09 to 0.6 parts by weight, and preferably 0.25 to 0.5 parts by weight, per 100 parts by weight of the total sum of vinyl chloride monomer and butyl acrylate monomer.

When the mixture of the first suspending agent and the second suspending agent is used in the present invention, said amount means the total sum of the first suspending agent and the second suspending agent, and the mixing ratio thereof can be controlled in the range disclosed above without particular limitation. For example, the first suspending agent and the second suspending agent may be mixed in the weight ratio of 10:90 to 90:10 within said range.

As an example, the suspending agent may include a mixture of 0.09 to 0.5 parts by weight of the first suspending agent and 0.01 to 0.1 parts by weight of the second suspending agent per 100 parts by weight of the total sum of vinyl chloride monomer and butyl acrylate monomer. More preferably, the suspending agent may include a mixture of 0.2 to 0.39 parts by weight of the first suspending agent and 0.05 to 0.11 parts by weight of the second suspending agent per 100 parts by weight of the total sum of vinyl chloride monomer and butyl acrylate monomer.

And, when the first suspending agent is used alone, the suspending agent may include 0.09 to 0.6 parts by weight of the second suspending agent alone per 100 parts by weight of the total sum of vinyl chloride monomer and butyl acrylate monomer.

The initiator may be one or more compounds selected from the group consisting of peroxide-based polymerization initiators and azo-based polymerization initiators, and preferably 2 or more compounds among them. Specifically, a lower temperature initiator and a higher temperature initiator may be used as the initiator.

As the peroxide-based polymerization initiator, lauryl peroxide, acetyl cyclohexanol peroxide, 2,2,4-trimethylpentyl-2-peroxyneodecanoate, α-cumyl peroxyneodecanoate, di-butyl peroxydicarbonate, t-butylhydroxy peroxide, bis(2-ethylhexyl)peroxydicarbonate, and so on may be used. And, as the azo-based polymerization initiator, azoisobutyronitrile, azobis(2,4-dimethyl)valeronitrile, and so on may be used. It is preferably that the initiator includes a mixture of a lower temperature initiator of 10 hr HLT 60° C. or less and a higher temperature initiator of 10 hr HLT 60° C. or more. The low temperature and higher temperature initiators may be peroxide-based compounds.

Furthermore, as disclosed above, the content of the initiator may be 0.05 to 0.15 parts by weight per 100 parts by weight of the total sum of vinyl chloride monomer and butyl acrylate monomer. The content of the initiator may be the total sum of the lower temperature initiator and the higher temperature initiator, and the mixing ratio is not limited particularly.

Meanwhile, in the step (b), the core structure of vinyl chloride-butyl acrylate copolymer is completely formed and simultaneously the shell structure of polyvinyl chloride is formed on the exterior of the core by partitively feeding a certain amount of butyl acrylate monomer continuously or discontinuously after the initiation reaction.

At this time, the content of butyl acrylate monomer may be 5 to 43 parts by weight, and preferably 15 to 32 parts by weight, per 100 parts by weight of the total sum of vinyl chloride monomer and butyl acrylate monomer.

According to said method, a vinyl chloride-butyl acrylate random copolymer resin can be prepared, and the resin may be a spherical particle having the average diameter of 50 to 250 μm and the volumetric specific gravity of 0.3 to 0.7 g/cc, and the content of butyl acrylate in the total copolymer may be 10 to 50 wt %. If the content of butyl acrylate in the vinyl chloride-butyl acrylate copolymer is lower than 10 wt %, the hardness increases and the characteristic of non-plasticized soft PVC may disappear, and if the content is higher than 50 wt %, the stickiness of the particle surface increases and the tractability of the resin decreases.

Furthermore, the vinyl chloride-butyl acrylate random copolymer resin of core-shell structure is a random copolymer having inner-plasticized characteristics, and has an advantage of being able to be processed without plasticizers positively necessary to produce a soft product. And, the vinyl chloride-based copolymer resin has the characteristics as same as a soft PVC including 40 parts by weight of plasticizer per 100 parts by weight of a polyvinyl chloride polymer resin having the degree of polymerization of 1300.

Therefore, the present invention can use the copolymer resin having the characteristics disclose above alone or as an additive of resin production.

According to preferable embodiment, the present invention can provide a resin product of particle form, including 100 wt % of the vinyl chloride-based copolymer resin of core-shell structure.

In addition, the present invention can provide a resin product, using the vinyl chloride-based copolymer resin of core-shell structure as a processing material or an impact modifier.

When the vinyl chloride-based copolymer resin of core-shell structure is used as an additive, it functions as a processing material and a partial impact modifier and can reduce the torque in the extrusion process in comparison with the same discharge amount.

Furthermore, the resin of core-shell structure including the vinyl chloride-butyl acrylate copolymer of the present invention can be applied to the preparation of eco-friendly products such as toys and medical supplies because it does not use extra plasticizers.

Hereinafter, preferable examples are presented for understanding the present invention. However, the following examples are only for illustrating the present invention and the present invention is not limited to or by them.

Example 1

0.39 parts by weight of a first PVA-based suspending agent and 0.11 parts by weight of a second PVA-based suspending agent were fed into a 280 L reactor, and then 0.02 parts by weight of a buffer and 0.05 parts by weight and 0.02 parts by weight of two kinds of peroxide-based polymerization initiators were fed thereinto in a lump and the reactor was vacuumized.

Subsequently, 68 parts by weight of vinyl chloride monomer was fed into the reactor and the reaction was initiated at the polymerization temperature of 60° C., 32 parts by weight of butyl acrylate monomer was partitively and continuously fed into the reactor and polymerized over 5 hrs of feeding time, and then the temperature was elevated to 65.6° C. and the additional secondary polymerization was carried out. The reaction was finished after 210 min after butyl acrylate monomer was completely fed. Unreacted vinyl chloride was separated through a recovery process and the reactor was cooled. The vinyl chloride-based copolymer resin including the vinyl chloride-butyl acrylate copolymer core and the polyvinyl chloride shell was obtained by discharging the resulted particles from the reactor, and dehydrating and drying the same.

At this time, the suspending agents, the polymerization initiators, and the buffer used in the present invention are as follows:

the first suspending agent: PVA having the degree of saponification of 71% the second suspending agent: PVA having the degree of saponification of 40% the first peroxide polymerization initiator: peroxide-based compound of 10 hr HLT 49° C.

the second peroxide polymerization initiator: peroxide-based compound of 10 hr HLT 64° C.

the buffer: sodium bicarbonate

The cross-section of the core-shell structure of the copolymer resin according to Example 1 is briefly illustrated in the FIGURE. In the FIGURE, drawing number 1 indicates the vinyl chloride-butyl acrylate copolymer core and drawing number 2 indicates the polyvinyl chloride shell.

Example 2

The copolymer resin was prepared substantially according to the same method as in Example 1, except that 85 parts by weight of vinyl chloride monomer and 15 parts by weight of butyl acrylate monomer were used.

Example 3

The copolymer resin was prepared substantially according to the same method as in Example 1, except that 76 parts by weight of vinyl chloride monomer and 24 parts by weight of butyl acrylate monomer were used.

Example 4

The copolymer resin was prepared substantially according to the same method as in Example 1, except that 0.2 parts by weight of the first PVA-based suspending agent and 0.05 parts by weight of the second PVA-based suspending agent were used.

Example 5

The copolymer resin was prepared substantially according to the same method as in Example 1, except that 0.2 parts by weight of the first PVA-based suspending agent was used alone.

Comparative Example 1

0.6 parts by weight of a PVA-based suspending agent or a MC-based suspending agent was fed into a 280 L reactor, and then 0.06 parts by weight of a peroxide-based polymerization initiator of 10 hr HLT 49° C. was fed thereinto in a lump and the reactor was vacuumized.

Subsequently, 100 parts by weight of vinyl chloride monomer and butyl acrylate were fed into the reactor in a lump and the reaction was initiated at the temperature of 60° C. The reaction was terminated when the total reaction pressure decreased −0.5 kg/cm2 from the pressure of the polymerization temperature. Unreacted vinyl chloride was separated through a recovery process and the reactor was cooled. The vinyl chloride-based copolymer resin was obtained by discharging the resulted particles from the reactor, and dehydrating and drying the particles.

Experimental Example

Average diameter, volumetric specific gravity, and hardness of the copolymer resins of Examples 1 to 6 and Comparative Example 1 were measured according to conventional methods. The results are listed in the following Table 1.

TABLE 1

|  | Example 1 | Example 2 | Example 3 | Example 4 | Example 5 | Comparative Example 1 |
| --- | --- | --- | --- | --- | --- | --- |
| Average Diameter (μm) | 117 | 83 | 93 | 144 | 180 | Particles were not formed |
| Content of Butyl Acrylate (wt %) | 32 | 24 | 15 | 32 | 32 | 40 |
| Volumetric Specific Gravity (g/cc) | 0.37 | 0.48 | 0.43 | 0.40 | 0.36 | N/A |
| Hardness (Shore A) | 85 | 92 | 88 | 87 | 85 | N/A |

As shown in Table 1, Examples 1 to 5 of the present invention could control the content of butyl acrylate in the copolymer and formed the particles having a certain average diameter. On the other hand, Comparative Example 1 could not form particles and it was impossible to measure the volumetric specific gravity and the hardness. Therefore, it was recognized that the present invention can provide an eco-friendly resin product easier than conventional methods by using the characteristics of core-shell structure and the particle form.

DESCRIPTION OF SYMBOLS

1: vinyl chloride-butyl acrylate copolymer, the core
2: polyvinyl chloride, the shell

What is claimed is:

1. A vinyl chloride-based copolymer resin of core-shell structure, characterized in that the core includes a vinyl chloride-butyl acrylate polymer, the shell includes a polyvinyl chloride, and the content of butyl acrylate in the copolymer is 10 to 50 wt % per the weight of the whole copolymer resin.

2. The vinyl chloride-based copolymer resin of core-shell structure according to claim 1, including 85 to 95 wt % of vinyl chloride-butyl acrylate polymer which is the core, and 5 to 15 wt % of polyvinyl chloride which is the shell.

3. The vinyl chloride-based copolymer resin of core-shell structure according to claim 1, which is a spherical particle having the average diameter of 50 to 250 μm and has the volumetric specific gravity of 0.3 to 0.7 g/cc and the shore hardness of 80 to 100.

4. A method of preparing the vinyl chloride-based copolymer resin of core-shell structure of claim 1, including the steps of:

(a) mixing 0.09 to 0.6 parts by weight of a suspending agent and 0.05 to 0.15 parts by weight of an initiator with 100 parts by weight of the total sum of vinyl chloride monomer and butyl acrylate monomer, and initiating a reaction at the polymerization temperature of 40 to 60° C.; and (b) partitively feeding 5 to 43 parts by weight of butyl acrylate monomer per 100 parts by weight of the total sum of vinyl chloride monomer and butyl acrylate monomer into the reaction product of step (a) continuously or discontinuously for 3 to 7 hrs and carrying out a suspension polymerization at the polymerization temperature of 45 to 70° C.

5. The method according to claim 4, wherein the suspending agent includes a mixture of:
a first suspending agent selected from a polyvinyl alcohol-based compound having the degree of saponification of 60 to 80%, a cellulose-based compound, and a mixture thereof; and
a second suspending agent selected from a polyvinyl alcohol-based compound having the degree of saponification of 30 to 50%, a 20 to 40% hydroxylated cellulose-based compound, and a mixture thereof.

6. The method according to claim 4, wherein the suspending agent includes a first suspending agent selected from a polyvinyl alcohol-based compound having the degree of saponification of 60 to 80%, a 20 to 40% hydroxylated cellulose-based compound, and a mixture thereof.

7. The method according to claim 5, wherein the suspending agent includes the mixture of 0.2 to 0.39 parts by weight of the first suspending agent and 0.05 to 0.11 parts by weight of the second suspending agent per 100 parts by weight of the total sum of vinyl chloride monomer and butyl acrylate monomer.

8. The method according to claim 6, wherein the suspending agent includes 0.09 to 0.6 parts by weight of the first suspending agent alone per 100 parts by weight of the total sum of vinyl chloride monomer and butyl acrylate monomer.

9. The method according to claim 4, wherein the initiator is at least one compound selected from the group consisting of lauryl peroxide, acetyl cyclohexanol peroxide, 2,2,4-trimethylpentyl-2-peroxyneodecanoate, α-cumyl peroxyneodecanoate, di-butyl peroxydicarbonate, t-butyl hydroxyperoxide, bis(2-ethylhexyl)peroxydicarbonate, azoisobutyronitrile, and azobis(2,4-dimethyl)valeronitrile.

10. The method according to claim 9, wherein the initiator includes a mixture of a lower temperature initiator of 10 hr HLT 60° C. or less, and a higher temperature initiator of 10 hr HLT 60° C. or more.

11. A particle form resin product, including 100 wt % of the vinyl chloride-based copolymer resin of core-shell structure of claim 1.

12. A resin product, using the vinyl chloride-based copolymer resin of core-shell structure of claim 1 as a processing material or an impact modifier.

* * * * *